United States Patent
Frederick, II et al.

(10) Patent No.: US 7,620,461 B2
(45) Date of Patent: Nov. 17, 2009

(54) SYSTEMS AND METHODS FOR USING A COMBUSTION DYNAMICS TUNING ALGORITHM WITH A MULTI-CAN COMBUSTOR

(75) Inventors: Garth Frederick, II, Greenville, SC (US); Thomas Raymond Farrell, Simpsonville, SC (US); Timothy Andrew Healy, Simpsonville, SC (US); John Carver Maters, Liberty, SC (US); Jonathan Carl Thatcher, Liberty, SC (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 11/768,751

(22) Filed: Jun. 26, 2007

(65) Prior Publication Data

US 2009/0005951 A1    Jan. 1, 2009

(51) Int. Cl.
G06F 19/00 (2006.01)
F02C 9/00 (2006.01)

(52) U.S. Cl. .................. 700/30; 700/287; 701/100; 60/772; 60/803

(58) Field of Classification Search ............ 700/30, 700/31, 33, 37, 287; 701/100; 60/772, 773, 60/803
See application file for complete search history.

(56) References Cited

U.S. PATENT DOCUMENTS

| | | | |
|---|---|---|---|
| 2005/0193739 A1* | 9/2005 | Brunell et al. | 60/772 |
| 2006/0248893 A1* | 11/2006 | Mick et al. | 60/772 |
| 2007/0062196 A1* | 3/2007 | Gleeson et al. | 60/722 |
| 2009/0005952 A1* | 1/2009 | Tonno et al. | 701/100 |

* cited by examiner

Primary Examiner—Ramesh B Patel
Assistant Examiner—Steven R Garland
(74) Attorney, Agent, or Firm—Sutherland Asbill & Brennan LLP (57) ABSTRACT

Embodiments of the invention can provide systems and methods for using a combustion dynamics tuning algorithm with a multi-can combustor. According to one embodiment of the invention, a method for controlling a gas turbine engine with an engine model can be implemented for an engine comprising multiple cans. The method can include obtaining operating frequency information associated with multiple cans of the engine. In addition, the method can include determining variation between operating frequency information of at least two cans. Furthermore, the method can include determining a median value based at least in part on the variation. Moreover, the method can include inputting the median value to an engine model, wherein based at least in part on the median value, the engine model determines an engine control action. In addition, the method can include outputting a control command to implement the engine control action.

20 Claims, 6 Drawing Sheets

SYSTEMS AND METHODS FOR USING A COMBUSTION DYNAMICS TUNING ALGORITHM WITH A MULTI-CAN COMBUSTOR

FIELD OF THE INVENTION

The invention relates to combustion dynamics control, and more particularly, to systems and methods for using a combustion dynamics tuning algorithm with a multi-can combustor.

BACKGROUND OF THE INVENTION

Design and operation of a combustion system in a rotary machine such as a gas turbine engine can be complex. To operate such engines, conventional combustion dynamics tuning algorithms can utilize one or more sensors associated with various engine components to obtain performance and operating characteristics of the engine. For example, a single can combustor can utilize outputs from multiple combustion dynamic sensors to tune the combustor using a conventional dynamics tuning algorithm. In another example, a can annular-type combustor, which can include multiple cans arranged in an annular-shaped configuration, can utilize inputs from multiple combustion dynamic sensors, one for each can, to tune the combustor using another conventional dynamics tuning algorithm. To account for can-to-can variations, the latter type of dynamics tuning algorithm may check whether each of the sensors are within a predefined range, and then the sensors can be set to a median performance value, or alternatively, outputs from all of the sensors can be averaged to determine a dynamics signal to take action on.

In some instances, one or more sensors associated with a combustor, such as a single can combustor or can annular-type combustor, may provide poor or errant data or measurements. For example, a sensor may fail during combustor operation, and data from the sensor may cease or otherwise be considered errant or poor. If more than one sensor provides poor or errant data or measurements, such data or measurements may be input to the conventional dynamics tuning algorithm. In other instances, poor tuning or decreased efficiency can result in excessive vibration in or damage to the combustor.

Thus, there is a need for systems and methods for using a combustion dynamics tuning algorithm with a multi-can combustor.

BRIEF DESCRIPTION OF THE INVENTION

Embodiments of the invention can address some or all of the needs described above. Embodiments of the invention are directed generally to systems and methods for using a combustion dynamics tuning algorithm with a multi-can combustor. According to one embodiment of the invention, a method for controlling a gas turbine engine with an engine model can be implemented for an engine comprising multiple cans. The method can include obtaining operating frequency information associated with multiple cans of the engine. In addition, the method can include determining variation between operating frequency information of at least two cans. Furthermore, the method can include determining a median value based at least in part on the variation. Moreover, the method can include inputting the median value to an engine model, wherein based at least in part on the median value, the engine model determines an engine control action. In addition, the method can include outputting a control command to implement the engine control action.

According to another embodiment of the invention, a system for controlling a gas turbine engine with multiple cans can be implemented. The system can include a plurality of sensors adapted to obtain operating frequency information associated with a respective can. Furthermore, the system can include a model adapted to receive information from the plurality of sensors. The model can be adapted to determine a variation between operating frequency information of at least two cans. Furthermore, the model can be adapted to determine a median value based at least in part on the variation. In addition, the model can be adapted to determine an output based at least in part on the median value. Moreover, the system can include a controller adapted to determine an engine control action based at least in part on the output from the engine model, and further adapted to output a control command to implement the engine control action.

According to yet another embodiment of the invention, a system adapted to control a gas turbine engine with multiple cans, each can having at least one sensor can be implemented. The system can include at least one model adapted to estimate performance of a gas turbine engine. Furthermore, the system can include at least one estimator adapted to determine a current state of the engine, and initialize the model with operating frequency information from the sensors. In addition, the system can include at least one model-based control adapted to utilize an output from the estimator and to provide at least one control command to the gas turbine engine.

Other embodiments and aspects of embodiments of the invention will become apparent from the following description taken in conjunction with the accompanying drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Embodiments of the invention are described below with reference to block diagrams and schematic illustrations of methods and systems according to embodiments of the invention. It will be understood that each block of the diagrams, and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

In embodiments of this invention, any physical system, control system or property of the engine or engine subsystem may be modeled, including, but not limited to, the engine itself, the gas path and gas path dynamics; actuators, effectors, or other controlling devices that modify or change any engine behavior; sensors, monitors, or sensing systems; the fuel metering system; the fuel delivery system; the lubrication system; and/or the hydraulic system. The models of these components and/or systems may be physics-based models (including their linear approximations). Additionally or alternatively, the models may be based on linear and/or nonlinear system identification, neural networks, and/or combinations of all of these.

Gas turbine engines are air breathing engines that produce work based on the Brayton thermodynamic cycle. Some non-limiting examples of gas turbine engines include: aircraft engines, power systems, propulsion engines for marine applications, turbines used as pumps, turbines used in combined cycle power plants, and turbines used for other industrial applications. In gas turbine engines, thermal energy is drawn from the combustion of fuel with air, the combustion of fuel with an oxidizer, chemical reactions and/or heat exchange with a thermal source. The thermal energy is then converted into useful work. This work can be output in the form of thrust, shaft power or electricity. The performance or operation of these engines is controlled through the use of actuators. Some non-limiting examples of actuators in gas turbine engines include fuel metering valves, inlet guide vanes, variable stator vanes, variable geometry, bleed valves, starter valves, clearance control valves, inlet bleed heat, variable exhaust nozzles, and the like. Some non-limiting examples of sensed engine values include temperatures, pressures, rotor speeds, actuator positions, and/or flows.

Figure 1:
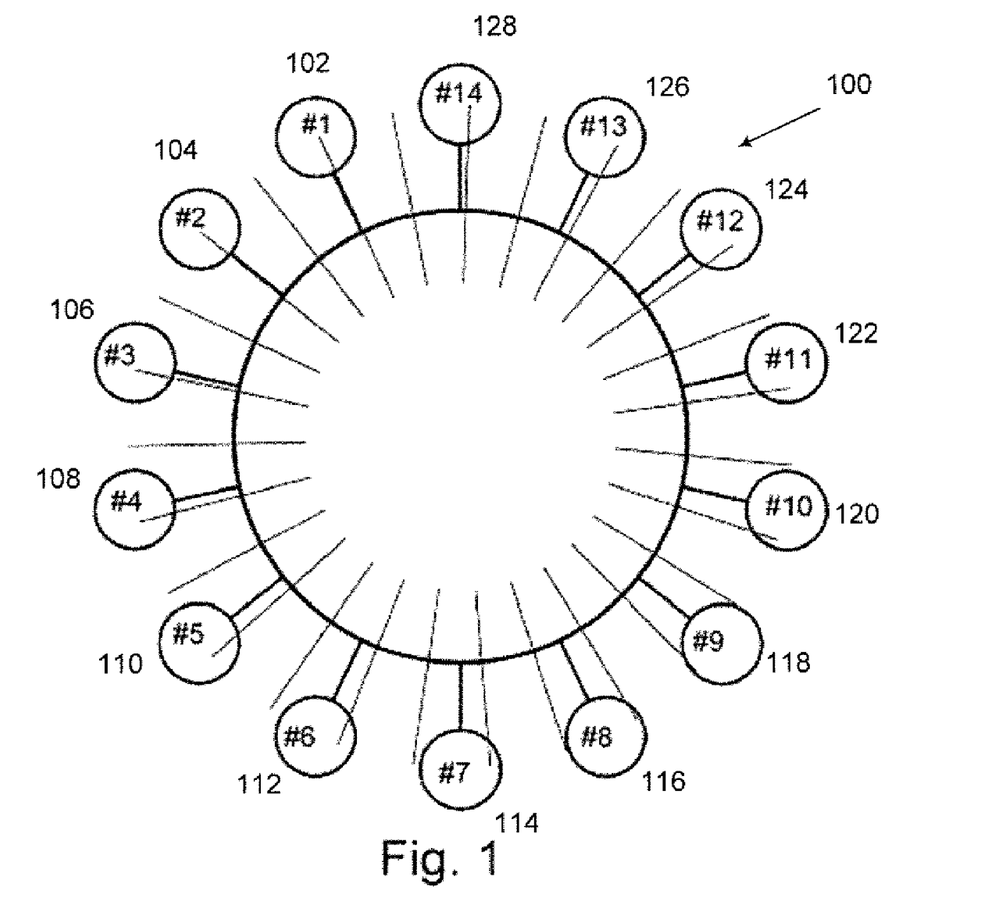
FIG. 1 is schematic diagram showing the layout of an example gas turbine engine that may be controlled by an embodiment of this invention.

One example schematic of an example gas turbine engine 100 is shown in FIG. 1. The example engine 100 shown is a can annular combustor system such as the GE Energy Heavy Duty gas turbine series. Multiple cans 102, 104, 106, 108, 110, 112, 114, 116, 118, 120, 122, 124, 126, 128, also designated as numbers 1 through 14, can be oriented in an annular-shaped configuration. Each can 102-128 can include at least one sensor, such as a dynamic pressure transducer, capable of measuring or otherwise detecting an operating frequency of the can or engine component. An example of a suitable sensor is disclosed in U.S. Pat. No. 6,708,568. Signals from each sensor can be processed using spectral analysis or similar techniques to isolate a frequency of interest.

Figure 3:
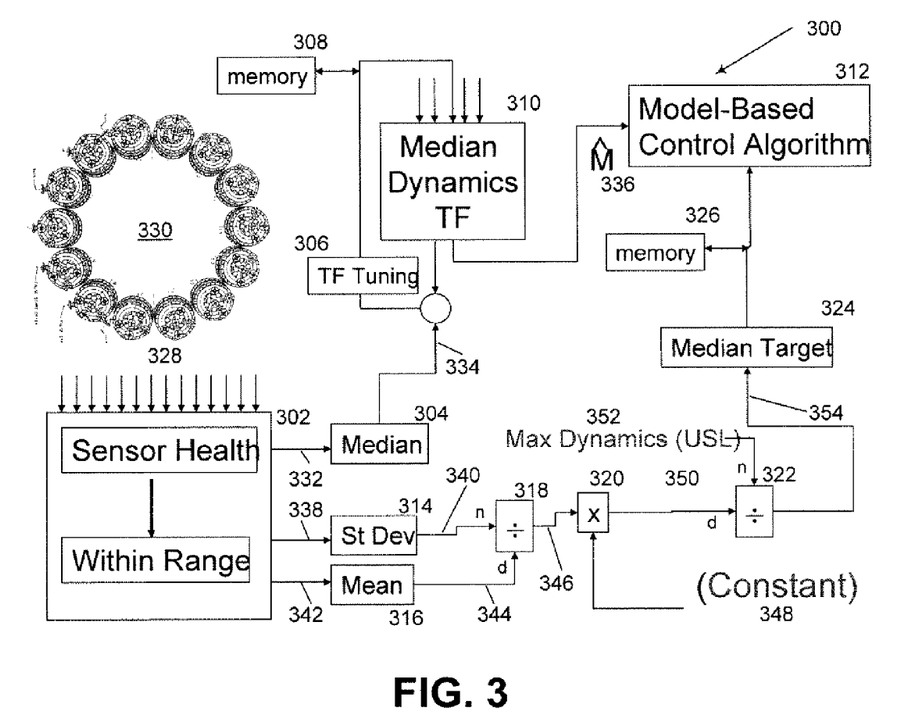
FIG. 3 is a block diagram illustrating an example combustion dynamics tuning model during execution according to one embodiment of the invention.

In one embodiment, operating frequency data from each can 102-128, such as dynamic pressure measurements, can be processed using a Fast Fourier transformation to determine the frequency content and amplitudes of the frequencies. Using this information, a frequency distribution such as a histogram can be generated. Based at least in part on the histogram, a representative operating frequency can be selected for the particular can or engine component. As shown in FIG. 3, operating frequency data or selected representative operating frequencies for each can 102-128 can be used as an input, such as 330, to an example combustion dynamics tuning model and algorithm. It will be understood that "operating frequency information" and "operating frequency data" can be used interchangeably, and that both phrases can include, but are not limited to, operating data, operating pressures, dynamic operating pressures, and operating amplitude data.

It will be understood by those skilled in the art that the embodiments described herein may be applicable to a variety of systems and are not limited to engines or other devices similar to that described in FIG. 1.

Figure 2:
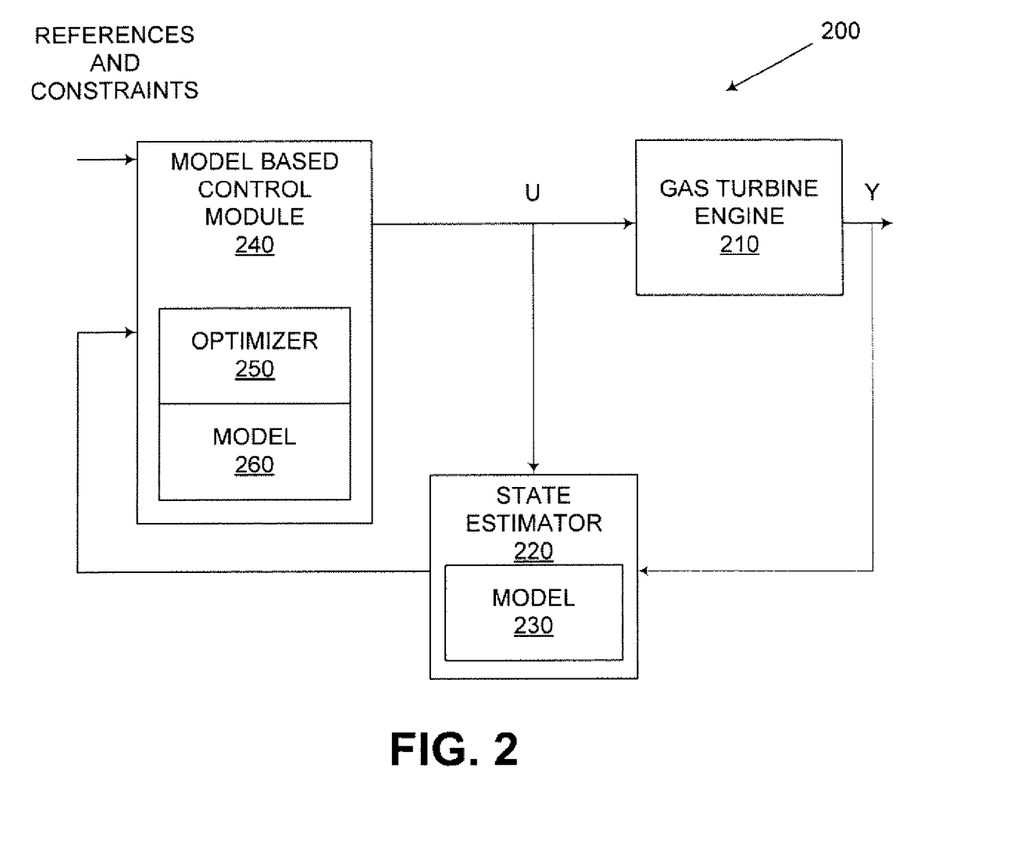
FIG. 2 is a block diagram illustrating components of an engine control system according to an embodiment of the invention.

FIG. 2 illustrates a control arrangement implementing an example engine model according to an embodiment of the invention. The control system 200 shown in FIG. 2 is adapted to monitor and control the physical engine plant or gas turbine engine 210 to provide substantially optimal performance under a variety of conditions. The plant or engine 210 can include sensors which sense or measure values Y of certain parameters. These parameters can include, but are not limited to, fan speed, operating frequencies, dynamic pressures, operating pressures, operating pressure ratios, and temperatures. The plant or engine 210 can also include one or more actuators which can be controlled by one or more command inputs U. The plant or engine 210 may be similar to, for example, the engine 100 illustrated in FIG. 1.

The values Y of the sensed or measured parameters are provided to a state estimator 220. The values input to the state estimator 220, such as sensor inputs, operating frequencies or dynamic pressures, can be used to initialize one or more values in the state estimator 220. The state estimator 220 can include an engine model or model 230 of the plant or engine 210. The model 230 can be used by the state estimator 220 to generate one or more state parameters which can include estimates of performance parameters. One example of a suitable engine model is described in further detail as 300 in FIG. 3.

The state parameters from the state estimator 220 and associated model 230 can be transmitted to a model-based predictive control module or control module 240. The control module 240 can use the state parameters to perform an optimization to determine commands for one or more actuators of the plant or engine 210. For example, the control module 240 can perform an optimization to determine one or more engine control actions and corresponding control commands for one or more actuators of a gas turbine engine. In this regard, the control module 240 can include an optimizer 250 and a model 260. The model 260 associated with the control module 240 may be identical to the model 230 associated with the state estimator 220. Those skilled in the art will recognize that an engine model or model can be implemented in either or both the state estimator 220 and control module 240. Using either or both of the models 230, 260 allows optimization of the engine 210 to converge rapidly.

In use, embodiments of the invention can be utilized to initialize an engine model, such as models 230, 260, on startup of the plant or engine 210. Furthermore, embodiments of the invention can be utilized to re-initialize the dynamic states of the model, such as models 230, 260, after any time of event, such as load rejection or a sensor failure. Other embodiments of the invention can be used to initialize dynamic states of other types of machines or devices in other circumstances.

FIG. 3 is a schematic diagram illustrating an example engine model during initial configuration and also during normal execution according to embodiments of the invention. This diagram illustrates data processing by various modules associated with an engine model or model 300 such as a combustion dynamics tuning algorithm model. As shown, the model 300 can include some or all of the following modules in accordance with embodiments of the invention: sensor health block 302; median block 304; transfer function (TF) tuning block 306; a memory block 308; median dynamics block 310; model based control algorithm block 312; standard deviation block 314; mean block 316; covariance block 318, constant block 320; median dynamics block 322; median target block 324; and a memory block 326. The module blocks 302-326 represent various "run time"-type modules for which various parameters can be input to each of the modules 302-326, and respective corresponding outputs can be received from the modules 302-326 in accordance with embodiments of the invention. Those skilled in the art will recognize that various inputs and outputs can be configured as data inputs, vectors, matrices, functions, and other mathematical-type devices. In any instance, the example model 300 shown can determine model predictions and dynamically tune combustion model predictions to measured performances in a real time environment for a gas turbine engine, such as 100 in FIG. 1, or a similar device. The example model 300 can be implemented with the gas turbine engine shown as 100 in FIG. 1, and the system shown as 200 in FIG. 2.

Sensor health block 302 receives one or more inputs 328 from an engine 330, similar to engine 100 shown in FIG. 1. For example, the inputs can be operating frequency information or dynamic pressure information from one or more sensors associated with respective cans oriented in an annular-shaped configuration. In the embodiment shown in FIG. 3, inputs from 14 sensors, one for each can of can-annular type engine can be obtained. In addition, the sensor health block 302 can determine whether some or all of the inputs 328 are valid input signals. In one embodiment, the sensor health block 302 can determine whether some or all of the inputs are within a predefined range by comparing the inputs 328 to a previously stored set of data.

In other embodiments, any number of inputs from the engine, or any number of cans associated with the engine can be input to the sensor health block 302.

In one embodiment, a determination whether to use some or all of the inputs 328 can be made depending on whether some or all of the inputs 328 are within a predefined range. Other embodiments may include different types of input signal validity checks, such as a simple range check or application of an algorithm to determine or evaluate input signal validity. In the event that some or all of the inputs 328 do not meet input signal validity checks or are not within a predefined range, some or all of the inputs 328 can be rejected, and no further action with respect to some or all of the inputs 328. Alternatively, additional data may be used to replace some or all of the inputs 328. In the event that some or all of the inputs 328 are found to be valid input signals or are within a predefined range, some or all of the inputs 328 can be further processed by other components of the engine model, such as model 300.

In the event that some or all of the inputs are found to be valid input signals or are within a predefined range, some or all of the inputs can be transmitted via 332 to the median block 304. The median block 304 can determine a median value 334 based on some or all of the inputs 330 transmitted. The median value 334 can be transmitted to the transfer function (TF) tuning block 306 for storage in and subsequent retrieval from memory block 308. In addition, the median value 334 can be input to the median dynamics transfer function (TF) block 310. In this manner, the transfer function (TF) tuning block 306 can utilize the median value 334 to tune, or modify, the median dynamics transfer function (TF) block 310 in order to reduce the difference between the median value 334 and the median dynamics transfer function (TF) block 310. The memory block 308 may be used to store and process the tuning variable data used to tune or modify the median dynamics transfer function (TF) block 310.

The median dynamics transfer function (TF) block 310 can receive input, or can otherwise be tuned or modified using the median value 334 with a median dynamics transfer function to determine an input "M hat" 336 to the model based control algorithm block 312. As shown by the multiple input arrows to the median dynamics transfer function (TF) block 310, additional median values for other operating frequencies can be input and simultaneously processed. In one embodiment, multiple inputs to the median dynamics transfer function (TF) block 310 can be implemented, and the output of block 310 may be a function of any number of different operating parameters and constants.

Utilizing the median value 334 associated with the input "M hat" 336 and the accompanying tuning variable from 306 and/or 308, control of the engine 330 by the model based control algorithm block 312 may be prone to problems when variations between can-to-can operating frequencies of the engine 330 are relatively large. The median transfer functions can be functions of operating conditions including, but not limited to, fuel flow, combustor fuel splits, fuel temperature, fuel composition, combustor pressure, and combustor airflow.

Referring back to sensor health block 302, some or all of the inputs 328, such as operating frequency information, is input to standard deviation block 314 via 338, where a standard deviation 340 can be determined. Furthermore, some or all of the inputs 328, such as operating frequency information, is input to mean block 316 via 342, where a mean 344 can be determined. Based at least in part on the standard deviation 340 and mean 344 input to the covariance block 318, the covariance block 318 can determine covariance between the inputs 328 associated with the cans of the engine 330. For example, the mean 344 can be divided by the standard deviation 340 to determine a covariance value 346 representative of the operation of the engine 330.

In one embodiment, the covariance value 346 can be modified by an engine-dependent function, such as 348. For example, an engine-dependent function can be determined based on prior data taken over time from one or more of a series of similar engines. Turning now to the constant block 320, the covariance value 346 can be multiplied or otherwise adjusted by the engine-dependent function 348 to determine a "maximum to median" dynamics ratio 350 representative of the operation of the engine 330.

Depending on prior operating performance of engine 330, an upper specification limit (USL) 352 can be predefined based on the highest or maximum operating frequency or dynamic pressure that the engine 332 may be safely operated at, or any other desired upper operating limit. As represented by the median dynamics block 322, the "maximum to median" dynamics ratio 350 can be adjusted or otherwise modified by the USL 352. In this instance, maximum to median" dynamics ratio 350 can be divided by the USL 352 to obtain a median target 354.

The median target 354 can be transmitted by the median target block 324 to be stored in memory block 326 for subsequent retrieval. Ultimately, the median target 354 can be input to the model based control algorithm block 312.

Utilizing the median target 354, control of the engine 330 by the model based control algorithm block 312 may be improved since variations between cans of the engine 330 can be accounted for. Control of the engine 330 in this manner can minimize the influence of poor sensor measurements by maintaining a maximum combustion dynamics limit on some or all of the cans associated with the engine 330. In one embodiment, as the median target 354 is continuously calculated and input to the model based control algorithm block 312, the control loop 302-310, 314-328, 332-354 is continuously "closed" and improved control of the engine 330 can result. In another embodiment, simultaneous or other real time processing of other operating frequencies can be performed and processed by the model 300 shown.

In use, some or all of the above processes and instructions can be used, and repeated as needed, to automatically and dynamically tune combustion in multiple cans of an engine, such as a can annular combustion engine, during model execution at any particular time. In this manner, the engine can be configured to "tune" the operating state of the combustion dynamics algorithm model to match measured dynamic performance of the engine or other device of interest.

Figure 4:
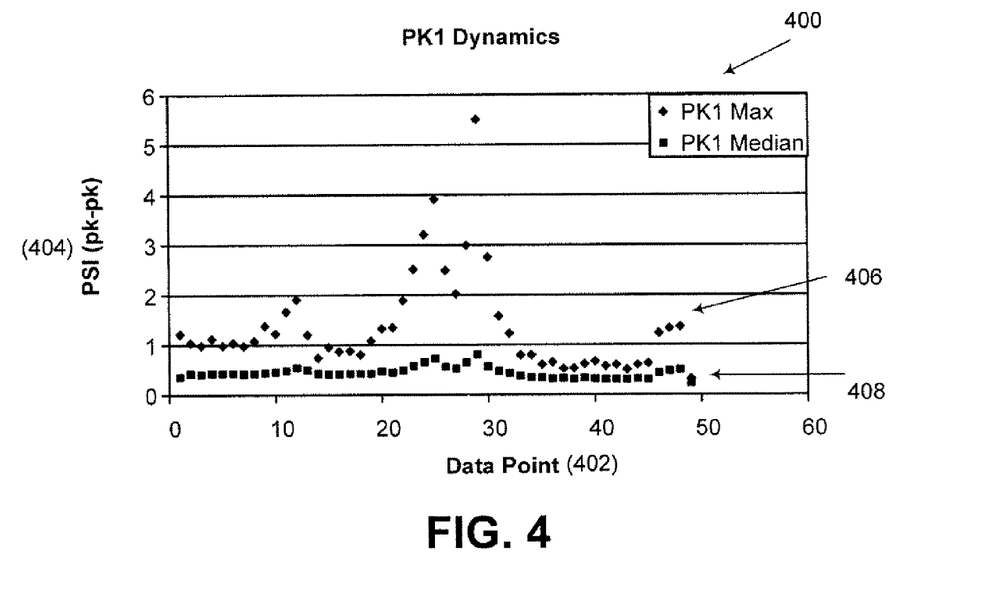
FIGS. 4-5 illustrate a series of example operating frequency data for a model and gas turbine engine according to embodiments of the invention.
Figure 5:
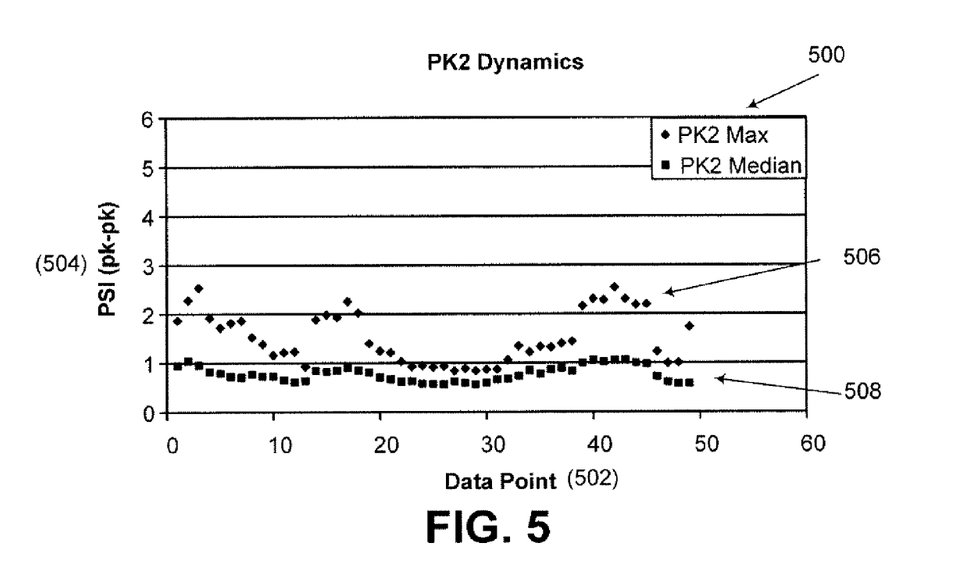
Figure 6:
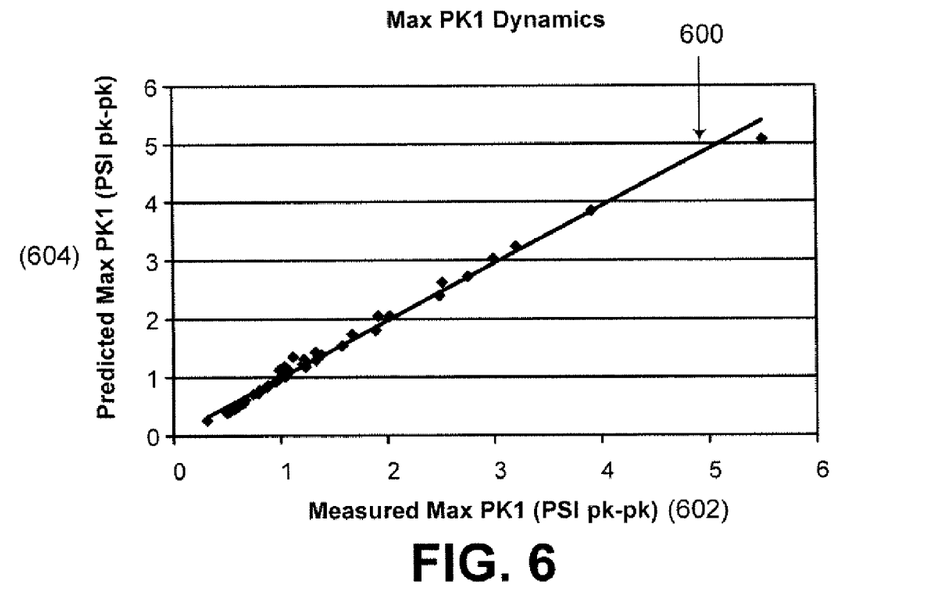
FIGS. 6-7 illustrate a series of example correlations for operating frequency data for a model and gas turbine engine in accordance with embodiments of the invention.
Figure 7:
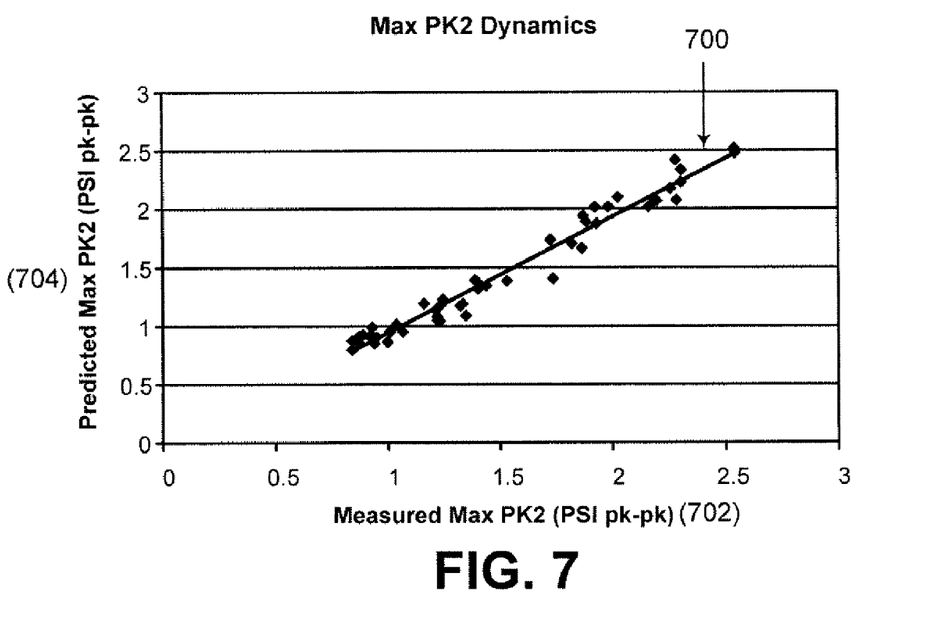
Figure 8:
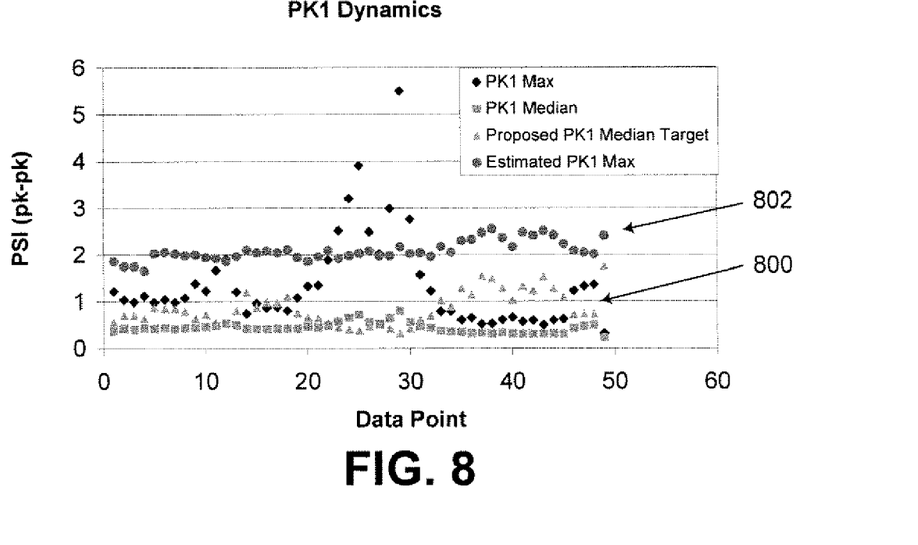
FIGS. 8-9 illustrate a series of example proposed and estimated operating frequency data points for a model and gas turbine engine in accordance with embodiments of the invention.
Figure 9:
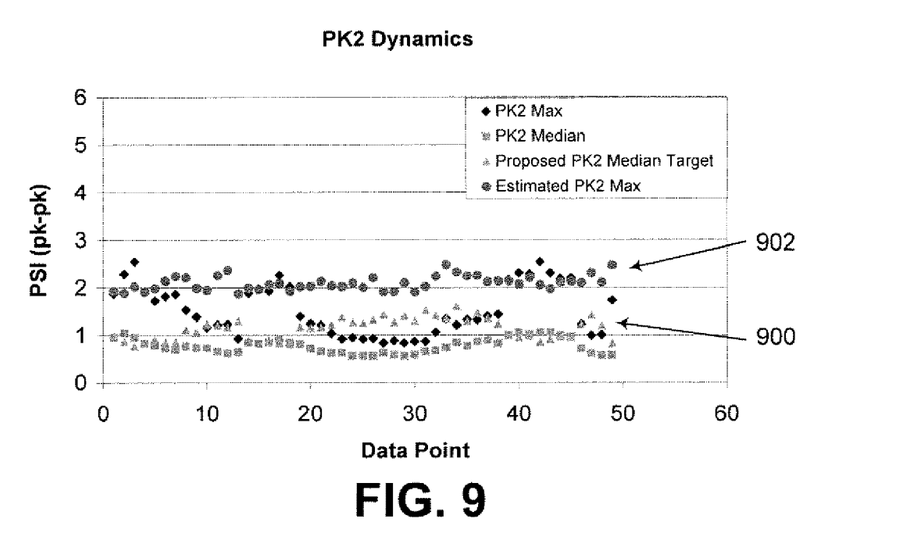

FIGS. 4-9 illustrate various operating frequency data for a particular type of gas turbine engine implementing a combustion dynamics tuning model, similar to that described in FIGS. 1-3, in accordance with an embodiment of the invention. FIGS. 4, 6, and 8 illustrate operating frequency data, correlations, and proposed and estimated target values for one particular operating frequency; whereas FIGS. 5, 7, and 9 illustrate operating frequency data, correlations, and proposed and estimated target values for a different operating frequency.

FIGS. 4 and 5 each illustrate a series of example steady state-type operating frequency data 400, 500 for the gas turbine engine. In both FIGS. 4 and 5, approximately 50 data points are plotted along the x-axis 402, 502 and the peak-to-peak dynamic pressures (psi) of the data points are shown against the y-axis 404, 504. In each Figure, maximum operating frequency data 406, 506 and median operating frequency data 408, 508 for each data point are shown. With reference to the data in these Figures, the maximum operating frequency data 506 for FIG. 5 is relatively smooth in comparison to the maximum operating frequency data 406 for FIG. 4. In particular, the maximum operating frequency data 406 in FIG. 4 appears to increase significantly between data points 24-30, whereas the maximum operating frequency data 506 in FIG. 5 remains relatively constant throughout the data points shown.

Generally, depending on the maximum operating frequency data, a median value, similar to the median value 334 described with respect to median block 304 in FIG. 3 can be selected for the operating data at a particular peak frequency. For example, using the maximum operating frequency data 506 in FIG. 5, a median value such as the value "2" can be selected since the maximum operating data 506 appears to remain constant at approximately the value of 2 psi against the y-axis 504. In contrast, the maximum operating frequency data 406 in FIG. 4 would not be suitable for selecting a median value, such as the value "2", since the data 406 is not relatively smooth for the data points shown and the significant increase shown by a portion of the data points could adversely affect any selected median value.

FIGS. 6 and 7 illustrate the implementation of a combustion dynamics tuning model using the operating frequency data 400, 500 shown in FIGS. 4 and 5 for the same gas turbine engine. In FIGS. 6 and 7, example "maximum to median" correlations 600, 700 between the respective predicted maximum operating data and measured maximum operating data of FIGS. 4 and 5 are shown. In the embodiments shown in FIGS. 6 and 7, the following equation associated with the combustion dynamics tuning model was implemented:

Predicted Max=Median×COV×Function (or Constant)

For the data in both Figures, median values (Median), covariances (COV), and engine-dependent function (Function or Constant) were determined for each data point and the resulting predicted maximum operating data was determined. Determination of the median values, covariances, and engine-dependent functions are similar to the determinations and calculations described with respect to the median value 334, covariance value 346, and engine-dependent function 348 described in FIG. 3. The resulting data points of FIGS. 6 and 7 were plotted against the respective x-axis 602, 702 indicative of the measured maximum pressure, and the y-axis 604, 704 indicative of the predicted maximum pressure. As shown in both Figures, the "maximum to median" correlations 600, 700 for each set of operating frequency data are relatively straight line correlations. Thus, based on these correlations, a new median target, similar to 354 shown with respect to median target block 324 in FIG. 3 can be determined or otherwise selected for use with the combustion dynamics tuning model, similar to 300 in FIG. 3.

Turning to FIGS. 8 and 9, the proposed peak (PK) median target data 800, 900 are respectively shown. In the embodiments shown, the following equation was implemented using the other existing data to determine estimated peak (PK) maximum.

Estimated PK Max=PK max−[(PK max/PK median)× (PK median−PK median target)]

As a result of implementation of this equation, the estimated peak (PK) maximum data 802, 902 were determined. As shown by the estimated peak maximum data 802, 902 for both operating frequencies, the implemented embodiment of the combustion dynamics tuning model can hold the upper specification limit (USL) closer to a value of approximately 2 psi for the particular operating frequency data of the gas turbine engine shown.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for controlling a gas turbine engine with an engine model, the engine comprising multiple cans, the method comprising:
   obtaining operating frequency information associated with multiple cans of the engine;
   determining the operating frequency information of at least two cans is within a predefined range;
   based at least in pan on the operating frequency information of the at least two cans, determining a median value;
   determining a median target based at least in part on a maximum to median dynamics ratio associated with the at least two cans;
   inputting the median value and median target to an engine model, wherein based at least in part on the median value and the median target, the engine model determines an engine control action; and
   outputting a control command to implement the engine control action.

2. The method of claim 1, wherein operating frequency information comprises dynamic operating pressures.

3. The method of claim 1, wherein the median value is based at least in part on a standard deviation and mean of at least a portion of the operating frequency information associated with the multiple cans.

4. The method of claim 1, wherein the median value is based at least in part on an engine dependent constant.

5. The method of claim 1, wherein the engine model comprises a combustion dynamic tuning algorithm model.

6. The method of claim 1, further comprising:
   inputting additional operating frequency information to the engine model to improve engine control.

7. The method of claim 1, wherein the method is performed by a computer.

8. A system for controlling a gas turbine engine with multiple cans, the system comprising:
   a plurality of sensors adapted to obtain operating frequency information associated with a respective can;
   a model adapted to receive information from the plurality of sensors, wherein the model is adapted to:
      determine the operating frequency information of at least two cans is within a predefined range;
      based at least in part on the operating frequency information of the at least two cans, determine a median value;
      determine a median target based at least in part on a maximum to median dynamics ratio associated with the at least two cans; and
      determine an output based at least in pan on the median value and median target;
   a controller adapted to determine an engine control action based at least in part on the output from the engine model, and further adapted to output a control command to implement the engine control action.

9. The system of claim 8, wherein operating frequency information comprises dynamic operating pressures.

10. The system of claim 8, wherein the median value is based at least in part on a standard deviation and mean of at least a portion of the frequency information associated with the multiple cans.

11. The system of claim 8, wherein the median value is based at least in part on an engine dependent constant.

12. The system of claim 8, wherein the model comprises a combustion dynamic tuning algorithm model.

13. The system of claim 8, wherein the model is further adapted to:
   receive additional operating frequency information to improve engine control.

14. The system of claim 8, wherein the model is implemented by a computer.

15. A system adapted to control a gas turbine engine with multiple cans, each can having at least one sensor, the control system comprising:
   at least one model adapted to estimate performance of a gas turbine engine;
   at least one estimator adapted to:
      determine a current state of the engine;
      initialize the at least one model with operating frequency information from the sensors, wherein:
         the operating frequency information of at least two cans is determined to be within a predefined range;
         based at least in part on the operating frequency information of the at least two cans, a median value is determined; and
         an output is determined based at least in part on a maximum to median dynamics ratio associated with the at least two cans; and
   at least one model-based control adapted to utilize the output from the at least one estimator and to provide at least one control command to the gas turbine engine.

16. The system of claim 15, wherein operating frequency information comprises dynamic pressures.

17. The system of claim 15, wherein the model comprises a combustion dynamic tuning algorithm model.

18. The system of claim 15, wherein the model is further adapted to input additional operating frequency information to the model-based control to improve engine control.

19. The system of claim 15, wherein the model is further adapted to iteratively repeat any number of steps to improve engine control.

20. The system of claim 15, wherein the model-based control is implemented by a computer.

* * * * *